US006818859B2

(12) United States Patent
Lodge

(10) Patent No.: US 6,818,859 B2
(45) Date of Patent: Nov. 16, 2004

(54) GLASS VIALS WITH DATA MATRIX CODES AND METHOD OF MAKING THE SAME

(75) Inventor: Daniel B. Lodge, Bridgeton, NJ (US)

(73) Assignee: Q.I.S., Inc., Rosenhayn, NJ (US)

( * ) Notice: Subject to any disclaimer, the term of this patent is extended or adjusted under 35 U.S.C. 154(b) by 417 days.

(21) Appl. No.: 09/938,997

(22) Filed: Aug. 27, 2001

(65) Prior Publication Data

US 2003/0039590 A1 Feb. 27, 2003

(51) Int. Cl.[7] .......... B23K 26/00

(52) U.S. Cl. .......... 219/121.85; 219/121.69; 427/555

(58) Field of Search .......... 219/121.69, 121.85; 427/555

(56) References Cited

U.S. PATENT DOCUMENTS 5,409,742 A * 4/1995 Arfsten et al. .......... 427/555
6,227,394 B1 * 5/2001 Shinoda .......... 220/2.1 A
6,270,728 B1 8/2001 Wijnschenk et al.
6,372,293 B1 * 4/2002 Mathus et al. .......... 427/271
6,681,055 B1 * 1/2004 Sato .......... 382/275
2002/0102362 A1 * 8/2002 Schneider .......... 427/555

FOREIGN PATENT DOCUMENTS

EP 404732 * 12/1990

OTHER PUBLICATIONS

Micronic Systems, "Sample Storage," 2000, pp. 5, 8.

* cited by examiner

*Primary Examiner*—Geoffrey S. Evans
(74) *Attorney, Agent, or Firm*—Norman E. Lehrer

(57) ABSTRACT

A glass vial which includes a tubular glass container having a closed bottom end and an open top end is disclosed. The bottom end of the container is painted with a ceramic paint. The vial is then fired so that the paint bonds to the bottom end. A laser beam is then used to etch a data matrix code into the painted bottom end of the container. The bottom end of the container may now be read by a machine in order to perform various tests on the sample contained within the vial.

1 Claim, 1 Drawing Sheet

GLASS VIALS WITH DATA MATRIX CODES AND METHOD OF MAKING THE SAME

BACKGROUND OF THE INVENTION

The present invention is directed toward a glass vial and more particularly, toward a glass vial with a data matrix code etched thereon and a method of making the same.

Traditionally, tubes or vials used to hold samples to be analyzed in medical laboratories are coded and stored in racks. The tubes are usually made from glass or plastic. The rows and columns of each rack are labeled with numerals and letters. The side of each the tubes is coded with its position within the rack. In this way, a person analyzing the samples reads the tubes with his or her eye and selects the tube needed. There are problems with this method, however, in that often the code cannot be read because the label is unclear or because the sample may be opaque, thereby obscuring the code. Also, the probability of human error is great in selecting the incorrect sample and automated systems are difficult when the sides of the vials are marked.

Another method for labeling a series of tubes or vials to be analyzed is to place a code on the bottom of each the tubes by laser etching and then placing the tubes within a rack. When a particular vial is to be used, an optical reading mechanism under the rack of coded tubes or vials is programmed to retrieve that vial. The machine then reads the code of the vial. A robotic arm or similar automated mechanism then selects the vial. Once the appropriate vial has been selected, a sample may be drawn from the vial, a testing reagent may be placed within the vial, or the vial may be otherwise analyzed. In this manner, the vial need not be removed from the general vicinity of the rack and an accurate reading will result as the each vial has a unique code.

A typical coding system known and used in the art consists of laser etching a matrix-like pattern of dots on a surface where a number of different unique codes can be achieved. For example, matrices with an uneven number of rows and columns can be used as well as other figures based on a dot pattern. For instance, a coding may be based on a number of concentric dot circles or on the basis of a spiral-shaped pattern of dots. One system for laser etching codes of vials is described, for example, in U.S. Pat. No. 6,270,728 to Wijnschenk.

While Wijnschenk describes a laser etched coding system for vials, it is limited to plastic vials. The Wijnschenk system is not applicable to glass vials and to Applicants Knowledge, no one has successfully developed a system that is capable of creating coded glass vials for use in such automated systems.

SUMMARY OF THE INVENTION

The present invention is designed to overcome the deficiencies of the prior art discussed above. It is an object of the present invention to provide a glass vial with a matrix code etched thereon.

It is another object of the present invention to provide a clear, readable code on a glass vial.

It is a further object of the present invention to provide a code on a glass vial which may be read by an optical reading machine.

In accordance with the illustrative embodiments demonstrating features and advantages of the present invention, there is provided a glass vial which includes a generally tubular glass container having a closed bottom end and an open end. The bottom end of the container is painted with a ceramic paint. The vial is then fired so that the paint bonds to the glass bottom end. A laser beam is then used to etch the code into the painted bottom end of the container. The bottom of the vial may now be read by a machine in order to perform various tests on the sample contained within the vial.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENTS

Figure 1:
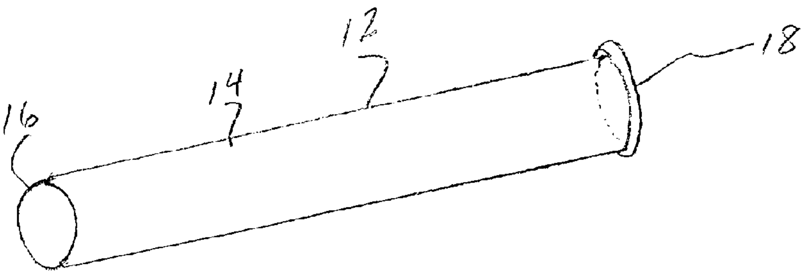
FIG. 1 is perspective view of a glass vial useful with the present invention.
Figure 2:
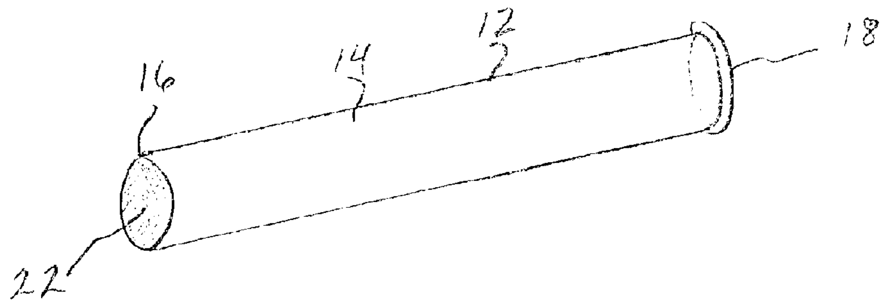
FIG. 2 is perspective view of the glass vial of FIG. 1 with ceramic paint on the bottom thereof.
Figure 3:
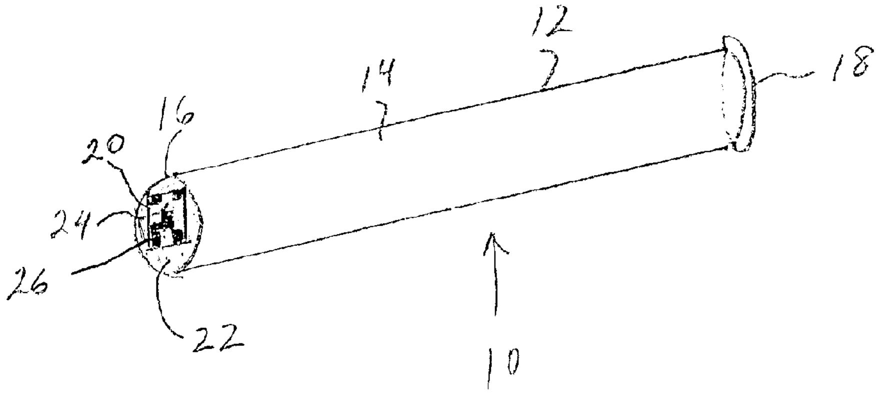
FIG. 3 is perspective view of the glass vial of FIG. 2 with a data matrix code laser etched into the bottom thereof.

Referring now to the drawings in detail wherein like reference numerals have been used throughout the various figures to designate like elements, there is shown in FIG. 3 a glass vial with a matrix code laser etched into the bottom thereof constructed in accordance with the principles of the present invention and designated generally as 10.

The present invention essentially includes a glass vial or tube 12 which includes a generally tubular glass container or housing 14 with a closed bottom end 16 and an open top end 18. In order to etch the matrix code 20 onto the vial, a ceramic paint 22 is applied to the bottom end of the container. The vial is then fired so that the paint 22 bonds to the glass bottom end 16 in a manner well known in the glass art. A laser beam is then used to etch a data matrix code 20 into the painted bottom end of the container using laser etching methods that are also, per se, known in the art.

Although not clearly shown in the drawings, the light areas 24 of the matrix code 20 are the areas where the paint 22 has not been affected by the laser beam. The dark areas 26 are those areas that have been etched by the laser. The dark areas 26 are not actually dark but merely optically have that appearance because of the depth of the laser etching and the relative optical properties of the areas 26 compared to the light areas 24.

An optical reading mechanism may be positioned beneath a rack of coded tubes or vials 12 so that the bottom 14 of each the vials may be read by the machine as described above. A robotic arm or similar automated mechanism then selects the vial. Once the appropriate vial has been selected, a sample may be drawn from the vial, a testing reagent may be placed within the vial, or the vial may be otherwise analyzed.

The present may be embodied in other specific forms without departing from the spirit or essential attributes thereof and accordingly, reference should be made to the appended claims rather than to the foregoing specification as indicating the scope of the invention.

I claim:

1. A process of forming a labeled glass vial comprising the steps of:

providing a generally tubular glass container having a closed bottom end and an open top end;

applying ceramic paint to the bottom end of said tubular container;

firing at least said bottom end of said tubular container so as to bond the paint to said bottom end; and laser etching a data matrix code into said fired bottom end wherein said data matrix code may be read by an optical reading machine.

* * * * *